United States Patent [19]

Shinozaki et al.

[11] Patent Number: 4,472,735
[45] Date of Patent: Sep. 18, 1984

[54] OPTICAL LOW-PASS FILTER

[75] Inventors: Takashi Shinozaki; Yoshichi Ohtake; Shinsuke Ono, all of Yokohama, Japan

[73] Assignee: Victor Company of Japan, Ltd., Yokohama, Japan

[21] Appl. No.: 255,217

[22] Filed: Apr. 17, 1981

[30] Foreign Application Priority Data

Apr. 18, 1980 [JP] Japan .................. 55-51415

[51] Int. Cl.³ .................. H04N 9/07; G02B 5/20
[52] U.S. Cl. .................. 358/47; 350/167
[58] Field of Search .................. 358/44, 43, 47, 55; 350/167, 286

[56] References Cited

U.S. PATENT DOCUMENTS

| 2,733,291 | 1/1956 | Kell . | |
|---|---|---|---|
| 3,716,666 | 2/1973 | Larsen . | |
| 3,781,091 | 12/1973 | Ferguson | 350/167 |
| 3,821,795 | 6/1974 | Okano . | |
| 4,093,346 | 6/1978 | Nishino et al. . | |
| 4,178,611 | 12/1979 | Okano . | |

FOREIGN PATENT DOCUMENTS

| 2359078 | 11/1973 | Fed. Rep. of Germany . |
|---|---|---|
| 2403570 | 4/1979 | France . |
| 1181348 | 2/1970 | United Kingdom . |
| 1218813 | 1/1971 | United Kingdom . |
| 1396889 | 6/1975 | United Kingdom . |
| 2049982A | 12/1980 | United Kingdom . |
| 1592902 | 7/1981 | United Kingdom . |
| 2082343A | 3/1982 | United Kingdom . |

Primary Examiner—Bruce Y. Arnold
Attorney, Agent, or Firm—Louis Bernat

[57] ABSTRACT

An optical low-pass filter is used in a television camera which has an optical system including an iris and a color stripe filter. The optical low-pass filter comprises a base plate, and a plurality of bi-prisms respectively formed on at least one surface of the base plate, and extending parallel with respect to one direction, where the plurality of bi-prisms are arranged at a pitch which is smaller than the diameter of a minimum aperture used of the iris.

8 Claims, 17 Drawing Figures

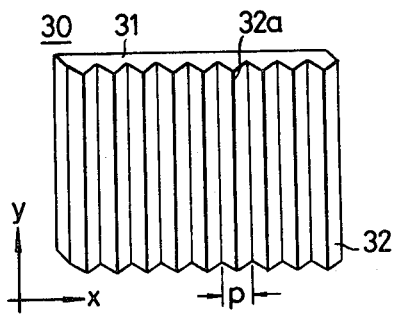
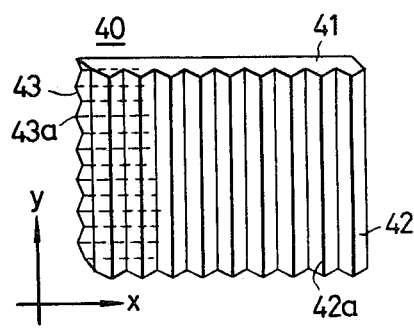
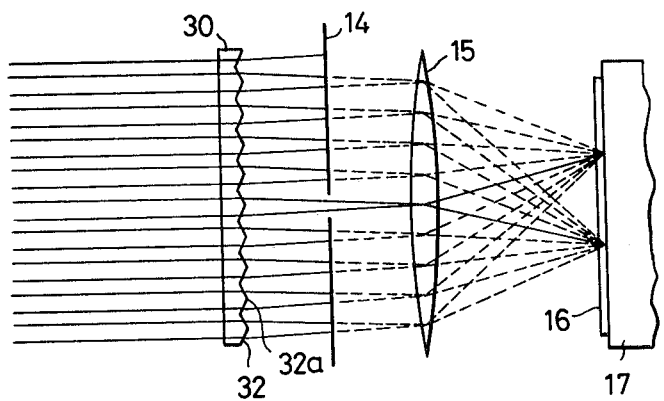
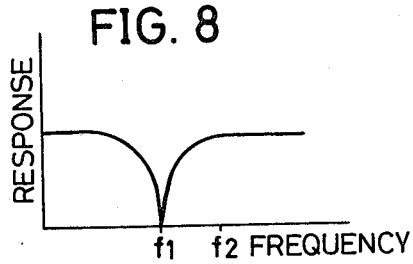
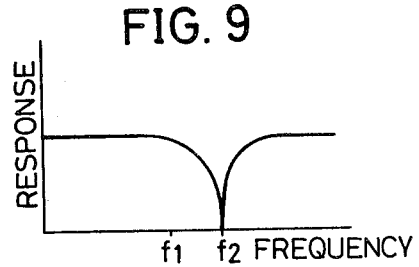
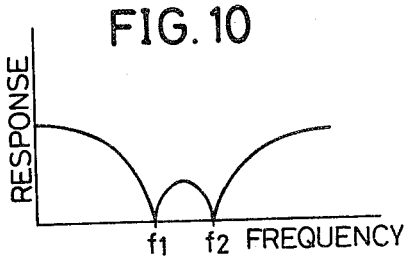

OPTICAL LOW-PASS FILTER

BACKGROUND OF THE INVENTION

The present invention relates generally to optical low-pass filters, and more particularly to an optical low-pass filter used in a color separating optical system of an image pickup tube in a television camera, which is of a simple construction and does not require positional adjustment.

In a television camera which uses a single image pick-up tube, a color separating optical system including a color stripe filter is used. However, in this optical system, beat is introduced between the high-frequency component of the luminance signal and the chrominance signal. Accordingly, in order to reduce the high-frequency component of the luminance signal so as to reduce the above beat, and optical low-pass filter (generally a filter having an attenuation pole) is generally employed.

A conventional optical filter of the above type used a polyhedron prism, for example. This conventional low-pass filter is unitarily formed from a polyhedron prism in which a plurality of surfaces are arranged radially from a vertex of the polyhedron in an oblique manner.

However, the shape of the above conventional low-pass filter is complex, and is disadvantageous in that it is difficult to manufacture the optical low-pass filter, and the cost of the filter is high. Furthermore, the optical low-pass effect decreases when the above optical low-pass filter is not mounted at the correct position with respect to an iris within the optical system. Accordingly, the vertex of the optical low-pass filter must be positioned and mounted so that the vertex accurately coincides with the center position of the iris within the optical system, and was disadvantageous in that the assembling and adjusting operation are troublesome.

Moreover, in an another example of a conventional optical low-pass filter, a quartz crystal plate was used. However, in this type of a conventional optical low-pass filter, the cost of the filter became high because the quartz crystal used is expensive. In addition, in such cases where the incoming beam is linearly polarized or when a plurality of quartz crystals are used, phase plates for one-quarter wavelength ($\lambda/4$ plate) and the like are required to obtain circular polarization. Therefore, the optical system became complex, and the optical low-pass filter could not be manufactured at low cost.

SUMMARY OF THE INVENTION

Accordingly, a general object of the present invention is to provide a novel and useful optical low-pass filter in which the above described problems are overcome.

Another and more specific object of the present invention is to provide an optical low-pass filter which is unitarily formed from a plurality of small bi-prisms which operate one-dimensionally.

Still another object of the present invention is to provide an optical low-pass filter in which a plurality of bi-prisms are formed at a pitch which is smaller than a predetermined iris dimension of an iris within an optical system being used. According to the optical low-pass filter of the present invention, the construction of the optical low-pass filter is simple, and the filter can be manufactured at low cost by use of materials such as synthetic resin which is inexpensive. Moreover, even when the iris is in a state to stop the incoming light beam quantity, one of the plurality of bi-prisms opposes an aperture of the iris, and thus the optical low-pass filter can be assembled with ease, requiring no adjusting operation of the mounting position of the optical low-pass filter within the optical system.

Other objects and further features of the present invention will be apparent from the following detailed description when read in conjunction with the accompanying drawings.

BRIEF DESCRIPTION OF THE DRAWINGS

FIG. 5 is a perspective view showing a first embodiment of an optical low-pass filter according to the present invention;

FIG. 6 is a diagram for explaining the operation of the optical low-pass filter shown in FIG. 5;

FIG. 7 is a perspective view showing a second embodiment of an optical low-pass filter according to the present invention;

FIGS. 8 and 9 are graphs respectively showing frequency characteristics of a bi-prism at each surface of the optical low-pass filter shown in FIG. 7;

FIG. 10 is a graph showing the frequency characteristic of the optical low-pass filter shown in FIG. 7;

DETAILED DESCRIPTION

Figure 1:
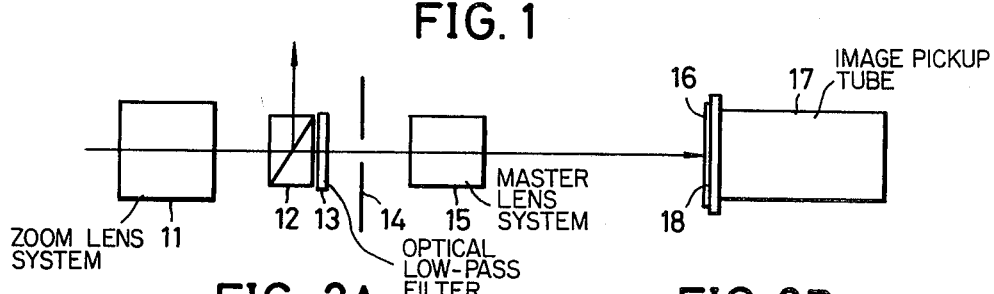
FIG. 1 is a diagram showing an example of an optical low-pass filter which can be applied to an optical system of a color television camera.

An essential part of an optical system of a color television camera is generally shown in FIG. 1. A part of a beam from an image which has passed through a zoom lens system 11, is reflected at a prism 12 and is directed towards a view finder system (not shown). The remaining portion of the beam passes directly through the prism 12, and passes through an optical low-pass filter 13, an iris 14, and a master lens system 15. The beam which has passed through the master lens system 15 further passes through a color stripe filter 16 provided at the front surface of an image pickup tube 17, and the image formation is obtained on an image pickup surface 18 of the image pickup tube 17.

Figure 2A:
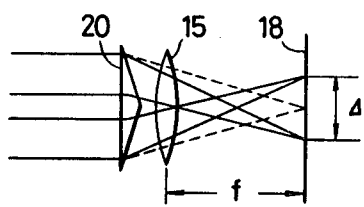
FIGS. 2A, 2B and 3 respectively are optical system diagrams for explaining the principle of an optical low-pass filter which uses a composite prism.
Figure 2B:
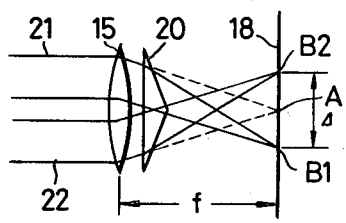

Next, the principle in which an optical low-pass filter is constructed by use of a bi-prism which operates one-dimensionally, will be explained in conjunction with FIGS. 2A, 2B, and 3. As shown in FIG. 2A, the optical filter, comprising a single bi-prism 20 having a large dimension which is unitarily formed from two prisms, is provided at a pupillary position of the lens system 15. However, as shown in FIG. 2B, the operating principle is the same when the above bi-prism 20 is provided at the rear of the lens system 15. Accordingly, description will be given with respect to FIG. 2B in order to simplify the explanation.

In FIG. 2B, light beams 21 and 22 tend to image at a point A on the image pickup surface 18 through the lens system 15, however, due to the bi-prism 20, the light beams 21 and 22 are refracted and are respectively imaged at mutually separated points B1 and B2. Thus, since the beams 21 and 22 are imaged at two positions, the optical image obtained becomes faded. When the fading width between the points B1 and B2 is designated by Δ, the optical transfer function (OTF) of the optical system can be described by a cosine function in which the response becomes zero when the fading width is equal to Δ, and an optical low-pass filter characteristic can accordingly be obtained. The value of the fading width Δ is set at a value respective of the frequency of a color sub-carrier wave in a color television signal with respect to the size of the image pickup surface.

Figure 3:
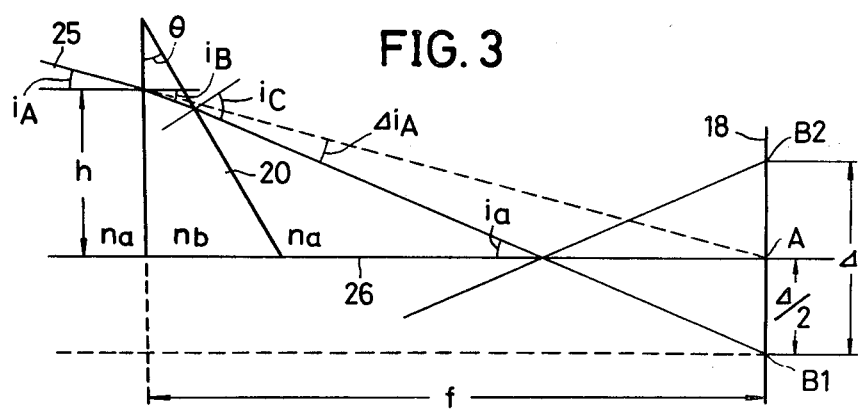
Figure 4:
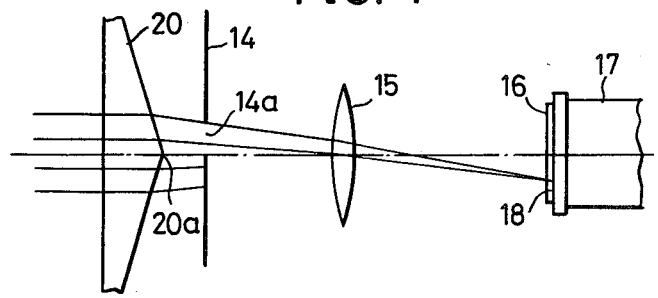
FIG. 4 is a diagram for explaining the operation in a case where the mounting position of an optical low-pass filter is deviated.

The refracted state of the beam in one prism of the bi-prism 20 shown in FIG. 2B, is shown in an enlarged scale in FIG. 3. A beam 25 refracted by the lens system 15 shown in FIG. 2B becomes incident over a position separated by a distance h from a lens optical axis 26 within the bi-prism 20 with an angle of incidence $i_A$. This beam is then refracted to pass through the bi-prism 20 as a refracted beam having an angle of refraction $i_B$. The refracted beam is further refracted by an angle of refraction $i_C$ when passing through the bi-prism 20, and is directed towards the image pickup surface 18. The beam travelling towards the image pickup surface 18 has an angle $\Delta i_A$ with respect to the above beam 25, and an angle $i_a$ with respect to the lens optical axis 26. The index of refraction (1.0 in the case of air) of air and the like, the index of refraction of the bi-prism 20 (1.5 in the case of an acrylic resin), the angle of the bi-prism 20, and the distance between the image pickup surface 18 and the edge surface of the bi-prism 20, are respectively designated by $n_a$, $n_b$, $\theta$, and f. In addition, in a case where the bi-prism 20 is provided at a position adjacent to the lens system 15, that is, at a pupillary position of the lens, the distance f is equal to the focusing distance of the lens system 15.

At a first point of refraction where the beam 25 enters within the bi-prism 20 and is refracted, the following equation (1) stands.

$$n_a \sin i_A = n_b \sin i_b \quad (1)$$

Moreover, at a second point of refraction where the beam leaves the bi-prism 20 and is refracted, the following equations (2), (3), and (4) respectively stand.

$$n_b \sin(i_B+\theta) = n_a \sin i_C \quad (2)$$

$$i_a = i_C - \theta \quad (3)$$

$$\Delta i_A = a - i_A = i_C - \theta - i_A \quad (4)$$

Since the angle $\theta$ is a very small angle, $\sin\theta = \theta$. Furthermore, when the medium surrounding the bi-prism 20 is assumed to be air, the index of refraction $n_a$ becomes equal to one. By considering the above, equation (1) can be rewritten as shown in equation (5).

$$n_a \cdot i_A = n_b \cdot i_B \rightarrow i_A = n_b \cdot i_B \quad (5)$$

In addition, equation (2) can be rewritten as shown in equation (6).

$$n_b(i_B+\theta) = n_a \cdot i_C \rightarrow i_C = n_b(i_B+\theta) \quad (6)$$

When equation (5) is substituted into equation (6), the angle of refraction $i_C$ can be described by the following equation (7).

$$i_C = n_b\left(\frac{i_A}{n_b} + \theta\right) = i_A + n_b \cdot \theta \quad (7)$$

Accordingly, from equation (4) and (7), the angle $\Delta i_A$ can be described by equation (8).

$$\Delta i_A = i_C - i_A \quad (8)$$
$$= i_A + n_b \cdot \theta - \theta - i_A$$
$$= (n_b - 1)\theta$$

Furthermore, since (tan $i_A$) and (tan $i_a$) can respectively be described by the following equations, $$\tan i_A = \frac{h}{f}$$

$$\tan i_a = \frac{h + \Delta/2}{f}$$

the fading width Δ can be described by the following equation (9).

$$\Delta/2 = f(\tan i_a - \tan i_A) \quad (9)$$

Since the angles $i_a$ and $i_A$ respectively become very small, the above equation (9) can be described by the approximating equation $\Delta/2 \approx f(i_a - i_A)$, and thus, the fading width Δ can be described by the following equation (10) by use of the equations (4) and (8).

$$\Delta \approx 2f \cdot i_A = 2f(n_b - 1)\theta \quad (10)$$

Therefore, the fading width Δ can be determined from f, $n_b$, and $\theta$.

In a case where the focusing distance of the lens system 15 is 25 milimeters, the angle $\theta$ of the bi-prism 20 is four minutes, that is, 1/15 degrees, and the bi-prism 20 is made of acrylic resin wherein the index of refraction $n_b$ is equal to 1.5, for example, the fading width Δ becomes as follows.

$$\Delta = 2 \times 2.5 \times (1.5 - 1) \cdot 2\pi \cdot \frac{1/15}{360}$$

$$\approx 0.058 \text{ mm} = 58 \ \mu\text{m}$$

By suitably determining the above fading width Δ, the space frequency which is interrupted can be selected arbitrarily. Thus, the above described bi-prism 20 forms an optical low-pass filter.

However, when a vertex (boundary line) 20a of the bi-prism 20 which forms the above optical low-pass filter is deviated from the center of an aperture 14a of the iris 14, if the diameter of the aperture is set small to set the stopping quantity large, the beam which is refracted by one of the prisms of the bi-prism 20 is interrupted by the iris 14, and the condition in which two images are obtained becomes lost. Accordingly, in this case, the bi-prism 20 does not function as an optical low-pass filter. Thus, in order to use the above bi-prism 20 as an optical low-pass filter, positional adjustment must be accurately performed upon mounting of the bi-prism 20, so that the position of the vertex (boundary line) 20a accurately coincides with the center of the aperture 14a of the iris 14, however, this mounting and adjusting operation is troublesome.

Accordingly, the present invention has eliminated the above described problems, and each embodiment of the invention will be described hereinafter.

FIG. 5 shows a first embodiment of an optical low-pass filter according to the present invention. In an optical low-pass filter 30 shown in FIG. 5, a plurality of bi-prisms 32 whose vertexes (boundary lines) 32a extend in a direction of the arrow y of a surface of an acrylic resin base 31, are formed unitarily and arranged in a manner so that the plurality of bi-prisms 32 are successively arranged in a direction of the arrow x at a predetermined pitch p. The pitch p is selected at a value smaller than the diameter of the aperture of the iris 14 which is in a state where the quantity of the interrupted incoming light beam is maximum as a setting practically used. When the maximum stopping value of the iris 14 is forty-five, and the diameter of the aperture of the iris 14 is 1.7 millimeters, for example, the pitch p is selected at 0.9 millimeters. Furthermore, in a case where a neutral density (ND) filter is used to reduce the quantity of light reaching the iris, the diameter of the aperture of the iris 14 is larger than the above value even when the iris is in a maximum stopping state. Hence, in this case, the pitch p is selected according to the above diameter of the aperture.

The operating state of the above described optical low-pass filter 30 is shown in FIG. 6. In FIG. 6, even in a case where the iris 14 is in a state in which the quantity of light stopped is maximum, the vertex (boundary line) of at least one bi-prism of the plurality of bi-prisms opposes the aperture of the iris. Accordingly, at least one bi-prism always opposes the aperture of the iris 14 regardless of the mounting position of the optical low-pass filter 30, and the optical low-pass filter 30 can always finely perform as a low-pass filter. Hence, the positional adjusting operation is not required upon mounting of the optical low-pass filter 30, and the optical low-pass filter can be mounted with ease.

Moreover, the optical low-pass filter 30 is press-moulded from a synthetic resin by use of a press mould, and thus, the optical low-pass filter can be manufactured at low cost.

Next, a second embodiment of an optical low-pass filter according to the present invention will now be described in conjunction with FIG. 7. In FIG. 7, an optical low-pass filter 40 is unitarily formed on one surface of an acrylic resin base plate 41, from a plurality of bi-prisms 42 whose vertexes (boundary lines) 42a respectively extend in a direction of the arrow y, in a manner so that the plurality of bi-prisms 42 are successively arranged along a direction of the arrow x. In addition, a plurality of bi-prisms 43 are unitarily formed on another surface of the acrylic resin base plate 41, where the vertexes (boundary lines) 43a of the plurality of bi-prisms 43 extend in the direction of the arrow x and the plurality of bi-prisms 43 are successively arranged along the direction of the arrow y.

Suppose that the bi-prism 42 has a filter characteristic comprising an attenuation pole at a space frequency f1 as shown in FIG. 8 with respect to the scanning direction of the electron beam, and the bi-prism 43 has a filter characteristic comprising an attenuation pole at a space frequency f2 as shown in FIG. 9 with respect to the scanning direction of the electron beam, for example, when the optical low-pass filter 40 is mounted in the television camera so that the electron beam scans in a direction inclined by an angle with respect to both the x and y directions. In this case, the optical filter characteristic of the optical low-pass filter 40 with respect to the scanning direction of the electron beam becomes as shown in FIG. 10. This optical low-pass filter 40 performs interrupting operations at different space frequencies with respect to two-dimensional directions, that is, in the scanning direction of the electron beam and in a direction perpendicular to the scanning direction of the electron beam.

Figure 11:
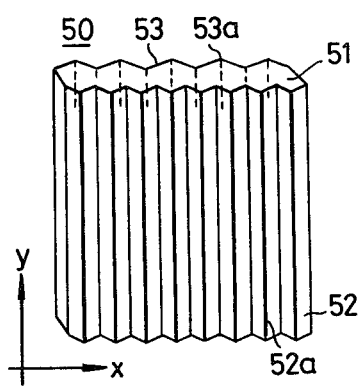
FIGS. 11, 12, 13, 14, and 15 are perspective views respectively showing third, fourth, fifth, sixth, and seventh embodiments of the optical low-pass filter according to the present invention.

FIG. 11 shows a third embodiment of an optical low-pass filter according to the present invention. In FIG. 11, an optical low-pass filter 50 is unitarily formed on one surface of an acrylic resin base plate 51, from a plurality of bi-prisms 52 whose vertexes (boundary lines) 52a respectively extend in a direction of the arrow y, in a manner so that the plurality of bi-prisms 52 are successively arranged at a predetermined pitch. In addition, a plurality of bi-prisms 53 are unitarily formed on another surface of the acrylic resin base plate 51a, where the vertexes (boundary lines) 53a of the plurality of bi-prisms 53 extend in the direction of the arrow y and the plurality of bi-prisms 53 are successively arranged at a pitch different from the above predetermined pitch. The bi-prisms 52 and 53 respectively have different space frequency interrupting characteristics, and the optical low-pass filter 50 accordingly has a combined space frequency interrupting characteristic of the above two interrupting characteristics.

Figure 12:
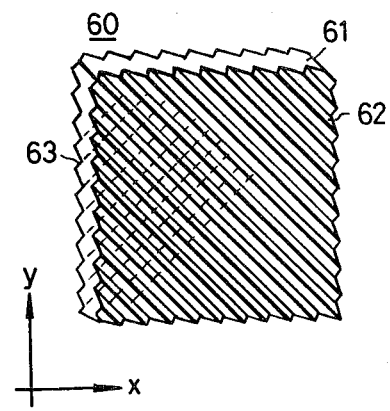

A fourth embodiment of an optical low-pass filter according to the present invention is shown in FIG. 12. In FIG. 12, an optical low-pass filter 60 is unitarily formed on one surface of an acrylic resin base plate 61, from a plurality of bi-prisms 62 whose vertexes (boundary lines) respectively extend in a direction inclined by forty-five degrees with respect to directions of the arrows x and y, in a manner so that the plurality of bi-prisms 62 are successively arranged. Furthermore, a plurality of bi-prisms 63 whose vertexes (boundary lines) extend in a direction perpendicular to the above direction inclined by forty-five degrees, are continuously and unitarily formed on another surface of the acrylic resin base plate 61. Accordingly, the present embodiment of the invention corresponds to a case where the embodiment shown in FIG. 7 is rotated by an angle of forty-five degrees, and used. In the present embodiment of the invention, the space frequency interrupting characteristic with respect to the directions of the arrows x and y can be set to a desirable characteristic, by suitably combining and setting the angle with respect to the directions towards which the vertexes (boundary lines) of the bi-prisms 62 and 63 extend.

Figure 13:
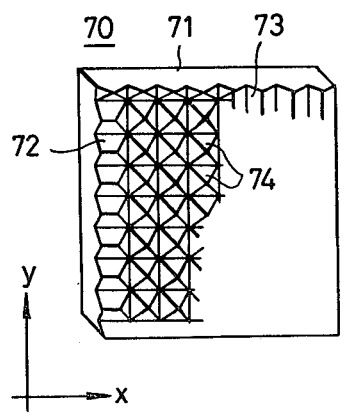

A fifth embodiment of an optical low-pass filter according to the present invention is shown in FIG. 13. An optical low-pass filter 70 is unitarily formed from a plurality of quadrangular pyramid-shaped bi-prisms 74. The bi-prisms 74 are formed from a combination of a plurality of bi-prisms 72 formed on one surface of an acrylic resin base plate 71 where the vertexes of the plurality of bi-prisms 72 respectively extend in a direction of the arrow x, and a plurality of bi-prisms 73 which respectively extend along a direction of the arrow y. Thus, the bi-prism 74 has a space frequency interrupting characteristic with respect to the directions of the arrows x and y.

Figure 14:
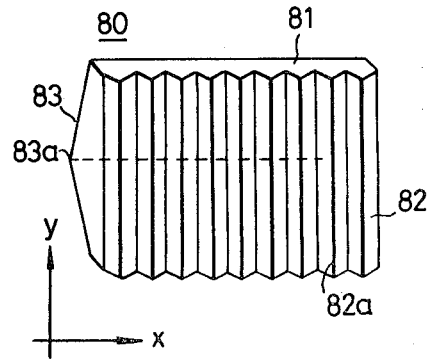

A sixth embodiment of an optical low-pass filter according to the present invention is shown in FIG. 14. In FIG. 14, an optical low-pass filter 80 is unitarily formed on one surface of an acrylic resin base plate 81, from a plurality of bi-prisms 82 whose vertexes (boundary lines) 82a respectively extend in a direction of the arrow y. Moreover, a bi-prism 83 whose vertexes (boundary lines) 83a respectively extend along a direction of the arrow x, is unitarily formed on another surface of the acrylic resin base plate 81.

Figure 15:
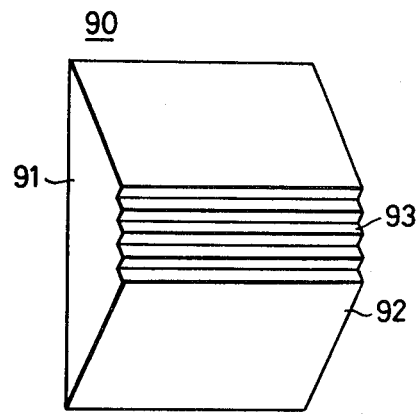

A seventh embodiment of an optical low-pass filter according to the present invention is shown in FIG. 15. In FIG. 15, an optical low-pass filter 90 is unitarily formed from an acrylic resin base plate 91 where one of whose surface has a shape of a bi-prism 92, and a plurality of bi-prisms 93 respectively provided at the central portion of the bi-prism 92 and extending in a direction parallel with respect to an imaginary vertex (boundary line) of the bi-prism 92.

Figure 16:
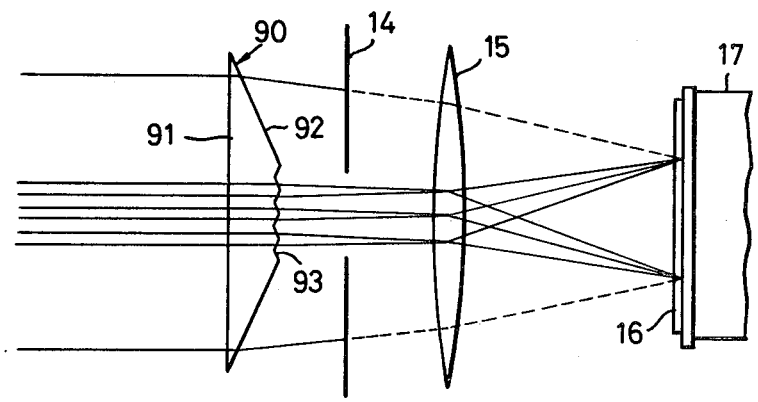
FIG. 16 is a diagram for explaining the operation of the optical low-pass filter shown in FIG. 15.

The operational state of the above described optical low-pass filter is shown in FIG. 16. As clearly seen in FIG. 16, even in cases in which the optical low-pass filter 90 is mounted in a manner where the center of the optical low-pass filter 90 is deviated with respect to the center of the aperture of the iris 14, or when the diameter of the aperture of the iris 14 is small due to the stopping operation of the iris 14 to interrupt portions of the incoming light, at least one of the plurality of bi-prisms 93 opposes the aperture of the iris 14, and the optical low-pass filter 90 always shows a fine optical low-pass filter characteristic.

In addition, in each of the above described embodiments of the invention, the pitch at which the plurality of bi-prisms are arranged may be set such that the pitch is small at the central portion of the optical low-pass filter instead of being constant throughout. That is, the pitch P of the bi-prisms 32 in the optical low-pass filter 30 shown in FIGS. 5 and 6, for example, may be set smaller at the central portion of the optical low-pass filter 30 opposing the aperture of the iris 14. The mounting error of the optical low-pass filter becomes a problem in a case where the diameter of the aperture of the iris is small due to the stopping operation of the iris to interrupt a portion of the incoming light, however, from this point of view, only the pitch of the bi-prisms at the central portion of the optical low-pass filter need to be small.

Further, this invention is not limited to these embodiments but various variations and modifications may be made without departing from the scope of the invention.

What is claimed is:

1. An optical low-pass filter system for use in a television camera which has a color stripe filter, said optical low-pass filter system comprising:
   a base plate having two spaced parallel sides, at least one of said sides receiving an incoming light beam;
   a plurality of adjacent bi-prisms which form a lenticular surface on at least said one of said two sides of said base plate;
   an iris which is adjustable between minimum and maximum apertures; and a lens system which directs the light beam to said color stripe filter,
   wherein said base plate, said iris, and said lens system are arranged in line and along an optical axis, and wherein each of said plurality of bi-prisms has a triangular cross section, the apex of said triangular cross section forming a ridge which extends perpendicular to said triangular cross section, said ridges of said adjacent bi-prisms being aligned and extending parallel to each other with said ridges lying in a given plane,
   said plurality of adjacent bi-prisms having at least one pitch which is smaller than the diameter of the minimum aperture used with said iris so that a plurality of said bi-prisms operates on said beam with said maximum aperture of said iris and at least one of said bi-prisms operates on said beam with said minimum aperture of said iris.

2. An optical low-pass filter system as claimed in claim 1 wherein at least some of said plurality of bi-prisms are formed on the other said two sides of said base plate, said some bi-prisms on the other of said two sides having mutually parallel ridges lying in a predetermined plane and extending in a direction that is different from the direction along which said ridges on said one of said two sides extend and wherein said two spaced parallel sides are perpendicular to said incoming light beam.

3. An optical low-pass filter system as claimed in claim 2 in which said ridges in said given plane and said ridges in said predetermined plane, respectively, extend in mutually perpendicular directions.

4. An optical low-pass filter system as claimed in claim 2 in which: said base plate has a rectangular shape defined by four sides; said ridges in said given plane extending in a direction which is inclined by 45° with respect to one of the four sides defining said rectangular shape; and said ridges in the predetermined plane extending in a direction inclined by 45° with respect to another of said four sides which is adjacent to said one side of the four sides; and wherein said ridges in said given plane and said ridges in said predetermined plane extend in mutually perpendicular directions.

5. An optical low-pass filter system as claimed in claim 1 wherein at least some of said plurality of bi-prisms are formed on the other of said two sides of said base plate, and wherein said plurality of bi-prisms on the one of said two sides has a pitch which is different from the pitch of the plurality of bi-prisms on the other of said two sides of said base plate.

6. An optical low-pass filter system as claimed in claim 1 wherein at least some of said bi-prisms are formed on the other of said two sides of said base plate, each of said bi-prisms formed on the other of said two sides having a ridge in a predetermined plane and extending in a direction which is different from the direction along which said ridges extend in said given plane.

7. An optical low-pass filter system as claimed in claim 1 wherein at least some of said bi-prisms are formed on said one of said two sides of said base plate, and wherein said some of said bi-prisms have mutually parallel ridges lying in said given plane and extending perpendicular to other of said ridges also lying in said given plane, said bi-prisms having ridges in said given plane forming a plurality of quadrangular pyramid-shaped prisms wherein each intersection of said some and said other ridges in said given plane form a vertex of each of said plurality of quadrangular pyramid-shaped prisms.

8. An optical low-pass filter system for use in a television camera which has a color stripe filter, said optical low-pass filter system comprising:
   a base plate having a truncated triangular cross section with a lenticular top surface which is parallel to the base of said truncated triangle, said base of said truncated triangle surface being positioned to receive an incoming light beam;

a plurality of adjacent bi-prisms respectively formed on the top surface of said truncated triangular cross section;

an iris which is adjustable between minimum and maximum apertures; and a lens system which directs the light beam to said color stripe filter, wherein said base plate, said iris, and said lens systems are arranged in line and along an optical axis, and wherein each of said plurality of bi-prisms has a triangular cross section, the apex of each of said triangular cross section forming a ridge which extends perpendicular to said triangular cross section, said ridges being aligned and extending parallel to each other and lying in a given plane which is parallel to said top surface, said plurality of adjacent bi-prisms having a pitch which is smaller than the diameter of the minimum aperture used with said iris so that a plurality of said bi-prisms operates on said beam with said maximum aperture of said iris and at least one of said bi-prisms operates on said beam under said minimum aperture of said iris.

* * * * *